May 3, 1955

C. B. MOORE, JR 2,707,603

BALLOON WITH RIGID FINS

Filed Sept. 6, 1952

INVENTOR
CHARLES B. MOORE, JR.
BY William C. Stueber
ATTORNEY

May 3, 1955
C. B. MOORE, JR
2,707,603
BALLOON WITH RIGID FINS
Filed Sept. 6, 1952
4 Sheets-Sheet 2
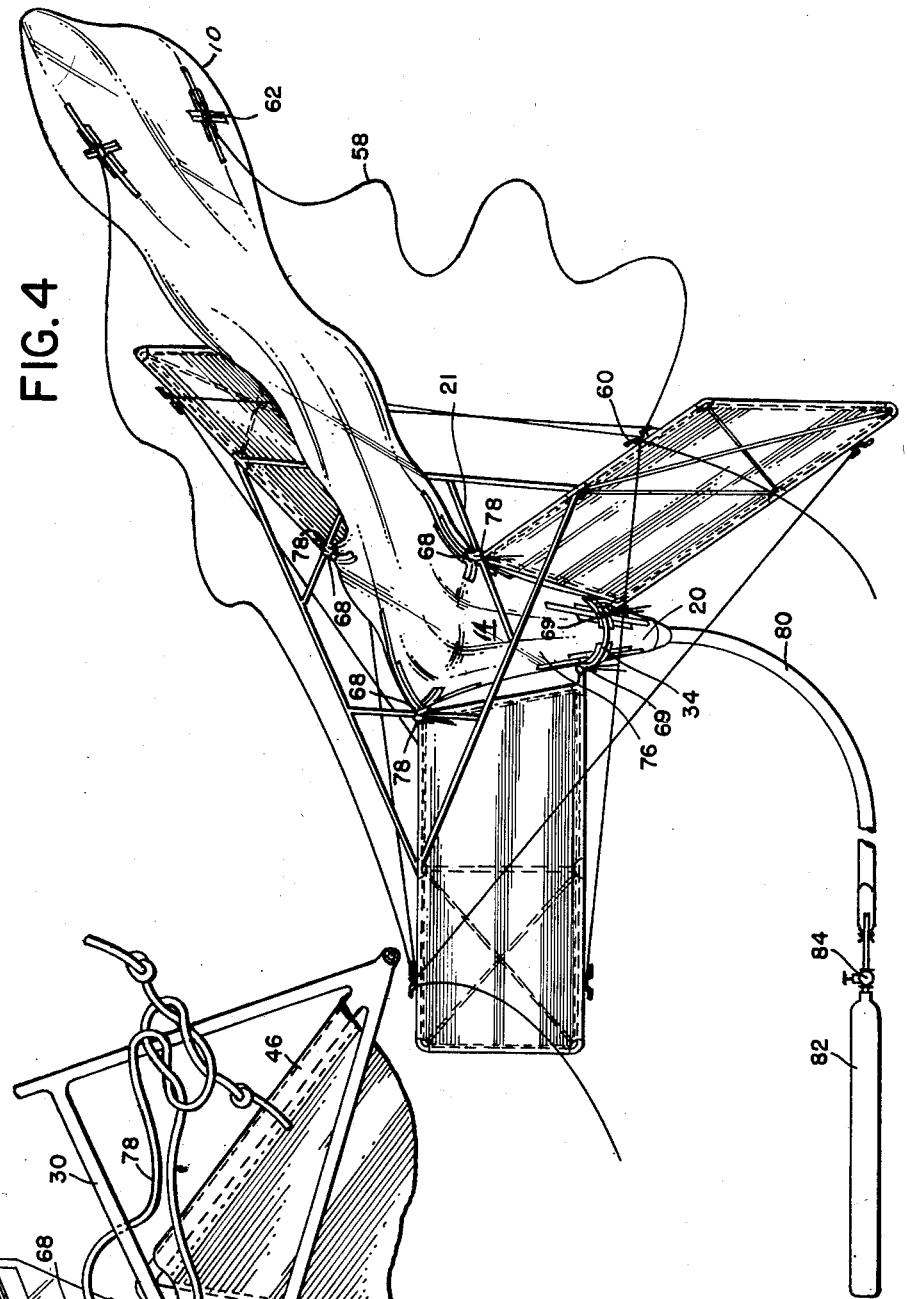
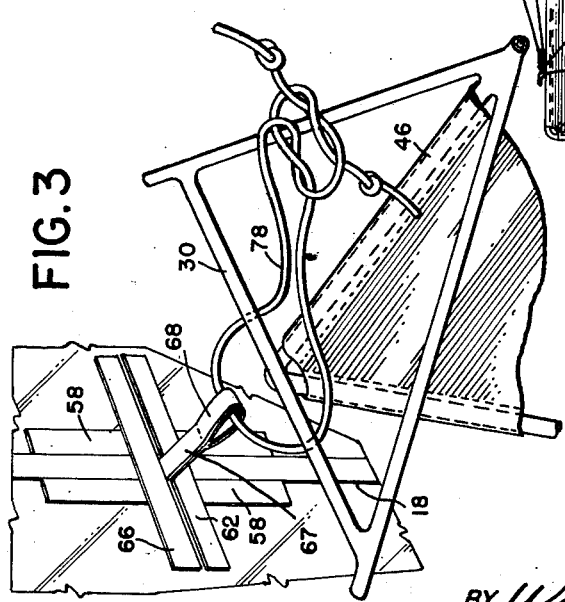
INVENTOR
CHARLES B. MOORE JR.
BY *William C. Strieber* ATTORNEY May 3, 1955     C. B. MOORE, JR     2,707,603
BALLOON WITH RIGID FINS
Filed Sept. 6, 1952     4 Sheets-Sheet 3
FIG. 6
FIG. 5
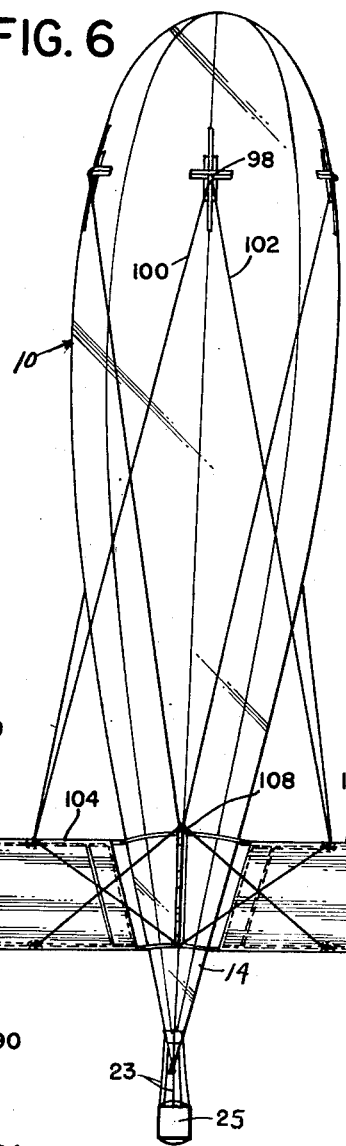
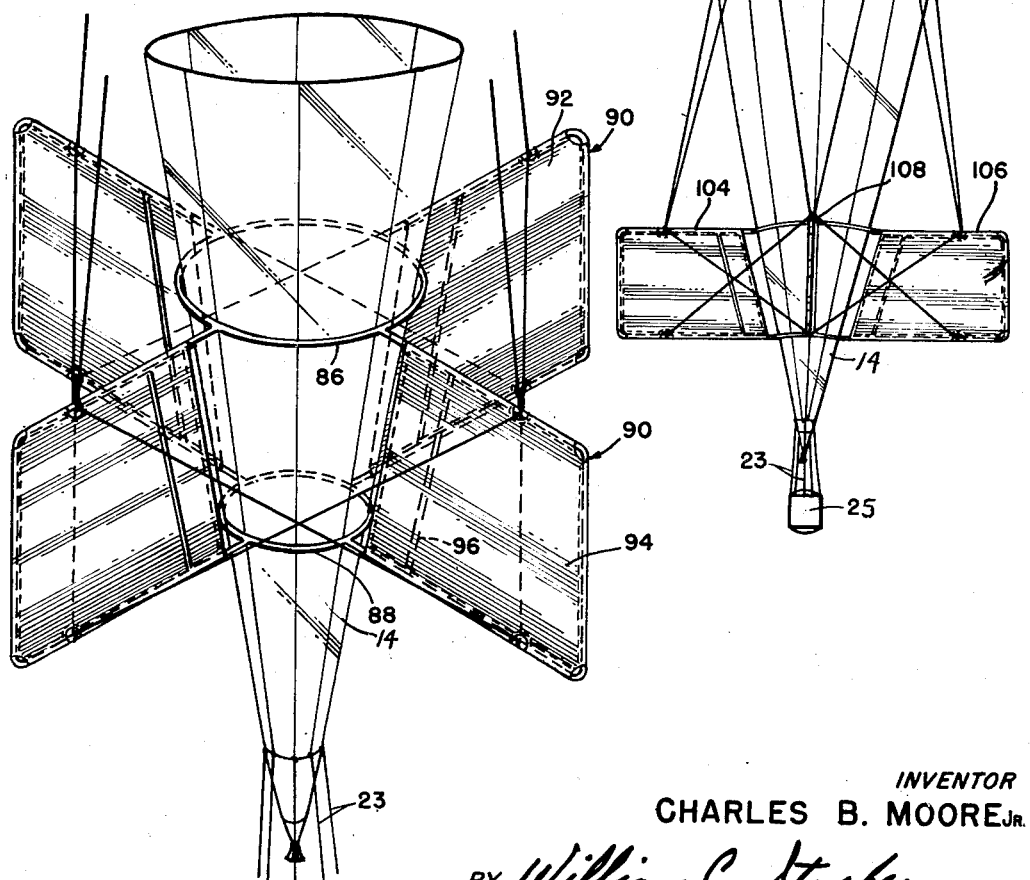
INVENTOR
CHARLES B. MOORE, Jr.
BY *William C. Stueber* ATTORNEY May 3, 1955

C. B. MOORE, JR 2,707,603

BALLOON WITH RIGID FINS

Filed Sept. 6, 1952

INVENTOR
CHARLES B. MOORE, Jr.

BY *William C. Stueber* ATTORNEY.

United States Patent Office 2,707,603
Patented May 3, 1955

2,707,603

BALLOON WITH RIGID FINS

Charles B. Moore, Jr., Robbinsdale, Minn., assignor to General Mills, Inc., a corporation of Delaware Application September 6, 1952, Serial No. 308,259

8 Claims. (Cl. 244—37)

This invention relates to fast-rising balloons and to a rigid tail assembly for guiding the path of balloon ascent.

In certain types of stratosphere balloons a rapid rate of ascent is desirable. If the time of ascent is reduced, the balloon will reach its maximum altitude in reduced time, thus reducing the drift which will occur before it reaches its maximum altitude. High wind velocities at greater altitudes make this an important factor. With a slow rate of rise a balloon may have drifted many miles before it reaches its maximum altitude and if the rate of rise can be increased the distance of drift will be reduced. An increase in the rate of rise is essential in order that the winds of high altitude be reached and measured before the balloon is carried over the horizon. Further, the necessary elevation angle measurements made by electronic gear are not trustworthy when near the horizon, due to ground reflections and there is a need for far greater accuracy to use the tangent relationships meaningfully.

Various steps are taken to increase the rate of ascent of a balloon, one of the most effective being the improvement of balloon design by changing the balloon to a streamline, low air-resistant shape. In a balloon formed of non-extensible material, such as light-weight plastic, the design shape can be rigidly controlled and a shape which is optimum for a fast rate of rise may be chosen, knowing that the balloon will retain that shape during its rise.

The shape of a balloon, aero-dynamically designed to yield a rapid rate of rise, is somewhat elliptical and therefore unstable. The attitude of the balloon during its ascent therefore becomes important. To take full advantage of its streamlined shape, the balloon should have no yaw and rise vertical. If the balloon yaws, i. e., rises in a slanting position, additional area will be presented and unnecessary air resistance will be encountered to slow down the rate of rise. When the balloon rises in a slanting position, instability often results with the balloon toppling back and forth and losing its rapid rate of rise.

It has been recognized in the art that the proper position of a balloon during ascent can be regulated and yaw eliminated by adding stabilizers or fin surfaces to the lower end of the balloon. Fin surfaces, properly designed, will guide the balloon so that its angle of attack is such that it presents the least wind resistance for its size and shape.

It is accordingly a prime object of the invention to provide an improved balloon guiding structure in the form of a rigid fin assembly which will accurately hold the balloon during its ascent in the optimum position for its design.

Another object of the invention is to provide a rigid fin assembly for a balloon which has structural strength and yet is simple and very light in weight, being sufficiently durable to withstand the stresses encountered by a balloon flying in severe weather conditions.

A still further object of the invention is to provide a balloon fin assembly and an improved method of attaching the assembly to the balloon, requiring a minimum of effort and time in order that the balloon might be easily launched with the fin assembly with a minimum of effort.

Other objects and advantages will become more apparent in the following specification, taken in connection with the accompanying drawings, in which Figure 1 is a perspective view of a fast-rising balloon during flight, having the improved rigid tail fin assembly attached;

Fig. 3 is an enlarged detail view illustrating the method of attaching the fin assembly to the wall of the balloon;

Fig. 4 is a perspective view illustrating the method of securing the tail fin assembly to the balloon;

Fig. 5 is a perspective view of an alternate form of a tail assembly structure;

Fig. 6 is a front elevational view illustrating a manner of carrying the fin assembly and securing it against rotational and axial forces;

Figure 1:
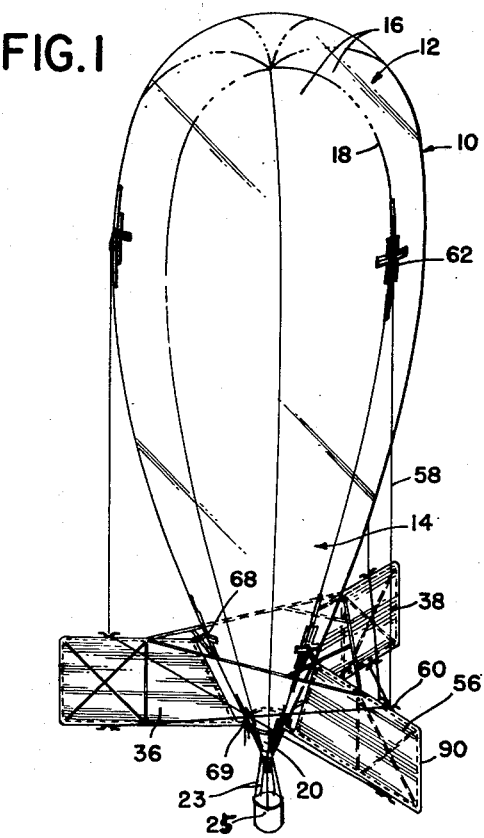

The fin assembly which incorporates the principles of the invention is affixed to a balloon of the type shown in Fig. 1. The balloon may be generally termed a "fast-river," being aerodynamically designed in shape to offer very low resistance as it rises. The balloon 10 has an upper rounded body portion 12 which tapers to a long tail portion 14, the balloon being symmetrical about a central vertical axis. The balloon is formed of gores 16 of non-extensible material joined together at seams with reinforcing tapes 18 placed on the seams. Since the material is non-extensible, the balloon will maintain its shape without being distorted by air pressure on its upper surface during its rapid rise. At the lower end of the balloon is an appendix 20 to which an inflating tube may be attached for the process of inflating the balloon. A load 25 is carried by the balloon, being supported by a harness 23 secured to the seam tapes 18.

The balloon in rising moves upward in substantially a vertical position with its axis being parallel to its path of rise. With a fast rate of rise the balloon may become unstable from air resistance as it rises and may topple or ascend in a slanting position, which will greatly slow down its ascent. To prevent this, tail fins are added. These fins have vertical surfaces parallel to the balloon axis which hold the tail downward. In order to obtain stable performance, these fins must be rigid with respect to the balloon and must have their surfaces accurately formed to be parallel to the balloon axis.

To cause the fins to remain stable with respect to the balloon, there has been provided a member which encircles the tail portion of the balloon, fitting snugly against its surface so that the pressure of the gas within the balloon holds the balloon surface out against the encircling member. A second similar encircling member is provided spaced from the first and these two members will always remain in a constant position with respect to the balloon, being held by the rigidity of the balloon. Additional members are provided which connect between these two encircling members and which project radially outward to form the framework for the tail surface.

Figure 2:
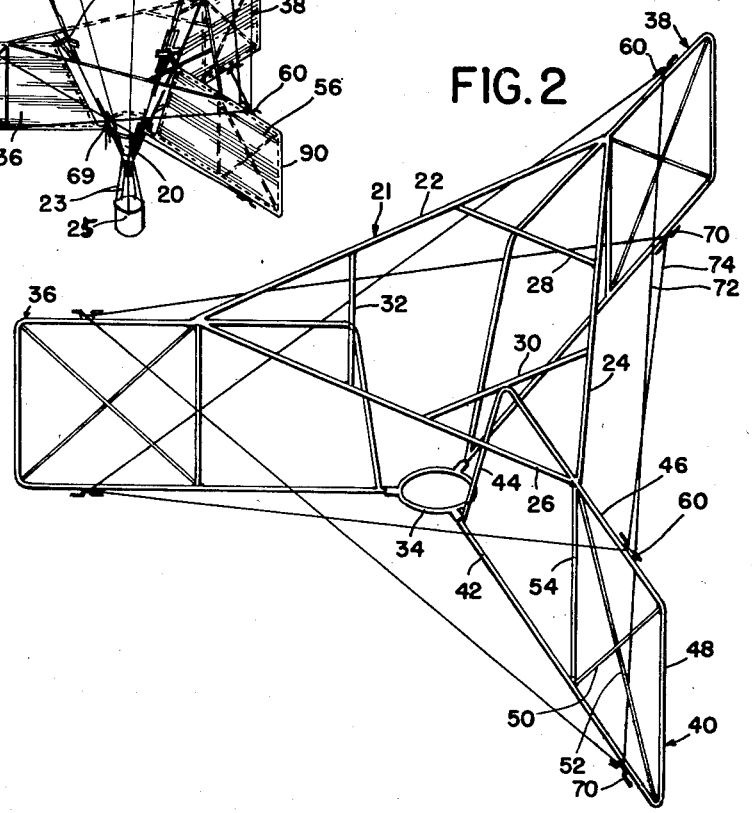
Fig. 2 is a perspective view of the skeletal structure of the tail fin assembly.

The encircling members, as will be seen from the description of the embodiments shown herein, may be of varied construction with the preferred construction shown in Fig. 2. This construction utilizes straight members wherever possible in order to obtain the greatest structural strength.

To form the encircling member, shown generally at 21, straight bars 22, 24 and 26 are triangularly arranged and secured at their ends. Three shorter bars 28, 30 and 32 are secured across each of the corners of the formed triangle. This combination of bars formed of the shorter bars and the sides of the triangle form a 6-sided enclosure which will encircle the tail of the balloon when secured in position on the balloon.

Forming another encircling member to stabilize the tail fin assembly on the balloon is a ring 34 spaced downwardly on the balloon tail from the upper encircling member 21. Secured between the two balloon encircling members and projecting radially out from the balloon center are the tail fins 36, 38 and 40. The skeletal structure of the fins is shown in Fig. 2 and each fin includes a lower rod 42 secured to and extending outwardly from the lower ring 34. Attached between the upper encircling member and the lower ring, being secured to the rod 30 and the lower rod 42, is a bar 44. This bar as well as forming the spacing member between the upper and lower encircling members 21 and 34, forms the inner support for the material covering the tail fin.

It will be noticed that each of the fins in the tail assembly is alike and therefore the description of one will suffice for all three.

Extending radially outwardly from the bar 30 is an upper rod 46. A vertical rod 48 connects between the outer ends of upper and lower radially extending rods 46 and 42 to complete a trapezoidally-shaped tail framework comprising the members 42, 46, 44 and 48. These members may be suitably connected at their corners such as by welding or may be formed of one continuous piece.

To add additional strength to the tail fin covering material, a pair of rods 50 and 52 extend diagonally to form a cross across the outer end of the trapezoidal frame and an additional rod 54 is secured to the frame between the inner ends of rods 50 and 52, thus completing the fin framework. This adds structural strength to the fin as well as giving additional support to the material used to cover the tail fin.

The framework of each of the fins is covered with a material 56, preferably of plastic film such as polyethylene, which is suitably secured to the frame.

Any type of material which is light-weight and resistant to the elements may be used as a covering for the fin and if of thermoplastic it may be attached by doubling over the framework and forming a weld by heat. By using a thin light-weight plastic, strength is afforded the fin with addition of a minimum weight. Further, the same material that forms the balloon may be used, effecting economy in material and time spent in fabrication, and a fin will be obtained which will withstand the same elements as the balloon.

The skeletal or structural framework of the fin is formed of light-weight members, such as aluminum tubes which may be secured at the joints by welding and which yield a strong framework and yet which are sufficiently light to avoid adding enough weight to the balloon to appreciably affect performance. Other strong lightweight materials, such as magnesium or balsa wood are also suitable. With the use of light-weight tubing and plastic film for the balloon and fin surface area, the balloons are capable of rising at an extremely rapid rate.

To aid in supporting the weight of the fins which extend outwardly from the balloon, lines 58 are secured between each of the fins and the side walls of the balloon. The lines are tied to the fins at a cleat 60 which is welded to the framepiece 46 and are tied to the side of the balloon through a loop 62, which has a design similar to the loop shown in Fig. 3.

Fig. 3 illustrates the structure of the loop 68 which is substantially the same as loop 62 and also loop 69. Fig. 1 illustrates the placement of the securing loops 62, 68 and 69 on the balloon. Short tapes 58 are secured on each side of the seam tape 18. A tape 67, having the loop 68 at its end, runs along the gore tape 18 and a holding tape 69 crosses the tape 67 below the loop. A second tape 66 also extends across tapes 58, 67 and 18 above the loop 68.

Loop 68 is used to tie the tail supporting structure to aid in maintaining it in position over the balloon end. To secure the tail to the balloon, a line is passed around the framepiece 30 of the upper encircling member 21 and over the end of the framepiece 46, being passed through the loop 68 and tied. Any number of loops may be provided, although the number shown is in most cases sufficient.

For adding further lateral strength to the tail fins, lines 72 and 74 are run diagonally across the adjoining fin, being secured to the upper and lower cleats 60 and 70.

The method by which the tail fin and balloon are assembled is illustrated in Fig. 4. The tail end 76 of the collapsed balloon is first inserted in through the upper encircling member 21 and through the lower ring 34. A line 78 is passed through each of the loops 68 on the side of the balloon and around the frame member 46 and knotted to secure the frame to the balloon. This method of tying the frame to the balloon is illustrated in detail in Fig. 3.

A similar securement is made with pieces of line tied through the loops 69 and the lower ring 34. It will be noted in Fig. 4 that the balloon is relatively slack within the upper encircling member and the ties 78 hold the balloon in place in the tail assembly until inflated. In this manner the ballon will not be inflated while being crooked within the tail assembly. Upon inflation, the balloon swells and forces itself against the upper encircling member 31 and within the lower ring 34 to hold the tail assembly snugly to the balloon. Supporting lines 58 are then tied to the cleats 60 and to loops 62 at the sides of the balloon.

To inflate the balloon, an inflation tube 80 is positioned in inflating position against the appendix 20. A lifting gas is supplied from a tank 82, the gas being fed through a valve 84 to which is attached the inflation tube 80. As the balloon inflates the end spreads against the framework of the tail fin assembly, holding it in place with respect to the balloon. The balloon, as it appears in Fig. 5, is inflated and, becoming inflated, assumes the appearance shown in Fig. 1, wherein the inflation tube has been removed.

After inflation, the balloon is released for ascent. As it rises, the surfaces of the tail structure guide the balloon ascent so that the balloon will always remain vertical. The tail structure, being held in place by pressure of the balloon against the framework members which encircle the balloon tail, remains properly oriented with respect to the balloon and guides it in vertical ascent. The frame has very little weight and therefore does not appreciably reduce the gross lift of the balloon but increases its net effect and the rate of rise by preventing any toppling of the ballon and permitting it to take full advantage of its design.

To illustrate the performance which may be obtained from a balloon formed of a light-weight plastic material provided with fins, the following flight is given as an example. A ballloon was constructed, as illustrated by the embodiment shown in Figs. 1 through 4, formed of polyethylene plastic 1½ mils thick. A payload of instruments and radio were attached weighing 3 pounds. The tail fin assembly was attached in the manner shown and the framework was of aluminum tubing covered with muslin. The balloon was completely stable and steady and had no noticeable yaw for the observable portion of its flight and the outstanding performance indicates that the balloon had no instability for the remainder of the flight.

After release, the balloon ascended to 30,000 feet in 9.6 minutes, which is a heretofore unheard of rate for a balloon carrying a load. The balloon continued ascent until it reached the high altitude of 38,000 feet, the maximum altitude at which it was designed to fly. The balloon material weighed approximately 4 pounds and the tail fin 4.7, making a total of 8 pounds in addition to the 3 pound load.

During the flight, the tail fins remained securely fastened to the balloon and remained oriented without any motion relative to the balloon, so as to hold the balloon steady.

An alternate form of tail fin assembly is illustrated in Figs. 5 and 6. This assembly has an upper encircling ring 86 and a lower encircling ring 88, both of which slide over the tail end 14 of the balloon. In Figs. 5 and 6 and the remaining figures, the numbers indicating like portions of the balloon are indicated by the same numbers set forth in Fig. 1. Attached between these two rings to hold them fixed relative to each other are framepieces shown generally at 90. These framepieces, in addition to holding the rings in place, provide a structure for covering the tail fins with the material 92. The tail fin framepieces 90 are formed of U-shaped members 94 secured at their ends to the upper and lower rings and having a cross brace 96 across the inner portion of the U.

In addition to illustrating another embodiment of the invention, Fig. 5 illustrates a tail fin assembly having four fins rather than three to demonstrate that varying numbers of fins may be used. The number is dependent upon the surface area presented by each fin and the amount of guide surface needed to hold the balloon stable in its ascent.

Fig. 6 also illustrates an alternate method of arranging supporting lines. Supporting loops 98 are secured to the side walls of the balloon above each of the fins of the tail assembly. Two stabilizing lines 100 and 102 extend laterally and are tied between the loop 98 and the two fins 104 and 106. The same arrangement is followed with each of the fins and it will thus be seen that lateral stability as well as vertical stability is given the fins.

Figure 7:
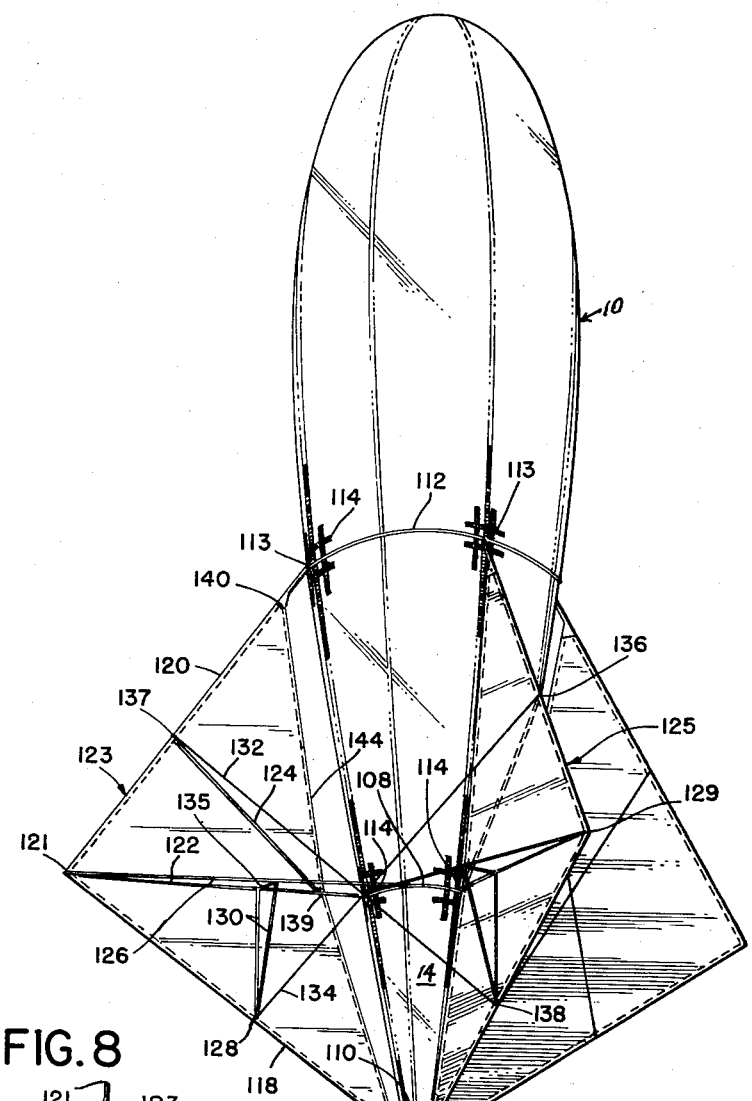
Fig. 7 is a perspective view of an alternate embodiment of the tail fin assembly.
Figure 8:
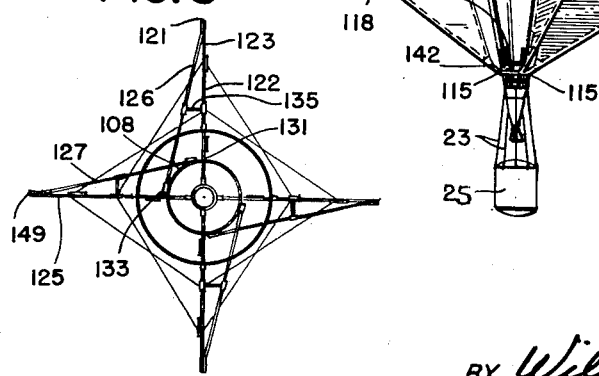
Fig. 8 is a plan view of the tail assembly of Fig. 7.

Fig. 7 illustrates another form of tail fin assembly wherein the stabilizing lines may be omitted. The fin assembly has the usual encircling members 108 and 110 which encircle the tail end of the balloon. In addition, an upper encircling ring 112 is formed and positioned over the balloon above the other encircling rings. Each set of rings is tied to the balloon by ends of line through securing loops taped to the balloon side. Ring 112, for example, is tied to loops 113; ring 108 is tied to loops 114; and ring 110 to loops 115. To form each of the fins shown, rods 118 and 120 extend from the lower ring 110 and the upper ring 112, respectively, projecting radially away from the balloon to meet at an apex 121 where they are joined. Connected from this apex to the central ring 108 is a reinforcing rod 122. The arrangement of supporting and reinforcing rods for the balloon fin surfaces are shown in Fig. 8. There, the two adjoining fins, 123 and 125, are given lateral stability by rods 126 and 127 which extend from the apexes 121 and 129 of the triangular fins, to the central ring 108 in a manner so that they meet the ring tangential to it, and are secured in that position. It will be seen that the combination of rods 122 and 126, being attached to the central ring 108 at points 131 and 133 which are separated from each other, give excellent lateral support to the fin 123.

To further strengthen the fin, a pair of rods 130 is secured at one end to a midpoint 128 of the rod 118 and extend upwardly to be fastened to the two rods 122 and 126. A small bar 135 is added to add additional rigidity to the framework. Another rod 124 extends from a midpoint 137 of the rod 120 to the point 139 on the rod 122. To add still more lateral rigidity to the fins, cross wires 132 and 134 are connected between the adjacent fins 123 and 125, the wire 132 being connected at points 137 and 138, and the wire 134 being connected at points 128 and 136.

To form the fin surface, material is stretched over and attached to the framework in the manner described in Fig. 8. For ease of assembly, the material should be attached to the fin before the cross wires are added. Material formed in a triangular shape is attached to the rods 120 and 118, and its base extends from points 140 to 142. To adequately secure the base of the cloth, additional rods may be added, or a line 144 may be drawn between the points 142 and 140, yielding some flexibility to the material. The fin material again is preferably of thin light-weight plastic or it may be of cloth, such as muslin, which may be coated with a waterproofing material.

The tail assembly shown in Figs. 7 and 8 does not employ stabilizing lines extending up to the sides of the balloon and has a larger number reinforcing rods than the tails shown in the other embodiments. The various embodiments shown are each better adaptable to certain designs of balloons, depending on the weight the balloon is to carry, its rate of rise, the weather conditions, the buffeting which it will suffer from wind, and so forth. Each tail fin assembly, however, provides a strong and light-weight structure which is capable of accurately guiding the balloon in ascent.

Thus it will be seen that I have provided a balloon fin tail assembly which holds itself rigid and stable with respect to a balloon and will not move about as the balloon is ascending. The tail assembly is structurally strong and yet extremely light in weight to avoid appreciably reducing the effective lift of the balloon. The assembly is simply and easily attached to the ballon and is sufficiently inexpensive that it may be expendable if lost on a balloon flight.

Keeping weight at a minimum is of utmost important if stratosphere altitudes are to be attained. With the use of this plastic film, altitudes before unattainable have become possible. Therefore, it is necessary to keep the tail fin assembly light if these attainments are not to be lost. With the apparatus of the present invention, a tail fin having great strength is obtained, yet it is so light in weight that the performance of the balloon is not impaired.

I have, in the drawings and specification, presented a detailed disclosure of the preferred embodiments of my invention, but it is understood that as the invention is capable of modification, structural changes and various applications of use within the spirit and scope of the invention, I do not intend to limit the invention to the specific form disclosed, but intend to cover all modifications, changes and alternative constructions and methods falling within the scope of the principles taught by my invention.

I claim as my invention:

1. A fin assembly for a high-altitude balloon capable of fast rise comprising a number of straight bars of light-weight material triangularly arranged and structurally joined at their ends to surround the end of a balloon, vertical fins attached at the joining point of the bars to form a fin assembly to guide the balloon in its ascent, the straight bars forming a support for the fins and forming an enclosure to surround the balloon end and hold the fins centered with respect to the balloon, and means to attach the fin assembly to the balloon wall.

2. The method of assembling a high-altitude balloon with a rigid tail fin assembly having a central opening to admit the tail of the balloon for holding the fin assembly in position with respect to the balloon, the method comprising passing the tail end of the balloon through an opening formed in the framework of the tail fins, securing the walls of the inflated balloon to the tail fin assembly, applying an inflating tube to the inflation opening of the balloon and inflating the balloon within the tail fin assembly, the walls of the balloon spreading against said opening to hold the fin assembly in place, and removing the inflating tube and releasing the balloon.

3. The method of assembling a high-altitude balloon and a rigid tail fin which comprises inserting the end of the balloon having the inflating appendage through an opening in the tail fin assembly, securing the tail fin assembly to the balloon wall to prevent its displacement before full inflation, extending lines between the side wall of the balloon and the tail fin guide surfaces and securing the line to the balloon and fin, applying an inflating mechanism and filling the balloon with a lifting gas, causing it to spread against the tail fin assembly holding it in place, and removing the inflating tube and launching the balloon.

4. A fast-rising balloon for carrying a payload and capable of ascent on the order of 30,000 feet in 9.6 minutes, being characterized by the balloon envelope being of a thin light-weight non-extensible plastic and inflated with a lifting gas, tail fins extending radially from the tail of the balloon and secured thereto, the tail having a framework of tubular aluminum which is covered with the same thin light-weight plastic material of the balloon looped over the framework at the edges and heat-sealed to secure it thereto.

5. A fin assembly for a high altitude balloon capable of a fast rate of rise comprising a series of first rigid rods of equal length attached at their ends to make a rigid polygon, a series of second rigid rods of equal length separately extending across each of the corners of the polygon and connected at their ends to said first rods to form triangles at the corners of the polygon, the combination of the first and second rods forming an encircling member which surrounds the tail of the balloon, a series of tail fin frames each comprising a four-sided frame with the edge of the upper side of each frame attached at the angle of said polygon so as to bisect said angle and also attached at the midpoint of each of said second rods to give the fins lateral support, a member encircling the tail of the balloon below said rods and secured to the lower corners of the tail fin frames, and a light weight material covering the tail fins.

6. A fin assembly for a high altitude balloon capable of a fast rate of rise comprising an upper encircling member and a second lower encircling member, the encircling members separated from each other to surround the balloon tail, means for attaching the encircling members to the balloon for securing the tail on the balloon, a plurality of tail fins projecting radially from the encircling members for forming tail fin surfaces, cleats attached to the edge of each of the tail fins for securing a stabilizing line thereto, first stabilizing lines secured to the cleats and extending between the fins to insure their spaced relationship, and second stabilizing lines also attached to said cleats and extending upwardly and secured to the balloon surface to aid in securing the tail to the balloon during ascent.

7. A fin assembly for a high altitude balloon capable of a fast rate of rise comprising a first encircling member surrounding the balloon tail and a second encircling member spaced from said first member and also surrounding the balloon tail, tail fins projecting radially from the balloon and secured to the encircling members, cleats secured to each of the fins for attaching a line between the fin and the balloon, a plurality of attaching means spaced from each other and secured to the surface of the balloon above each of the fins, and a pair of lines attached to each of the cleats and extending upwardly from each of the fins at an angle to the vertical balloon axis and separately to different attaching means to prevent rotational displacement of the tail fins.

8. A fin assembly for a high-altitude balloon capable of fast rise comprising a first top ring surrounding the balloon tail, a second intermediate ring surrounding the balloon tail and spaced from the first, a third similar bottom ring spaced from the said first and second rings, each of said rings being secured to the balloon surface and closely surrounding the balloon to prevent lateral displacement, triangularly shaped radially extending fins positioned with one corner opposite each of said rings, the first and third corners secured to the top and bottom rings, and braces extending from the intermediate ring to the second corner of the fins to stabilize and secure the fins to the balloon.

References Cited in the file of this patent

UNITED STATES PATENTS

| | | |
|---|---|---|
| 1,513,001 | Nobile | Oct. 28, 1924 |
| 2,398,744 | Jalbert | Apr. 16, 1946 |
| 2,492,800 | Isom | Dec. 27, 1949 |
| 2,526,719 | Winzen | Oct. 24, 1950 |

FOREIGN PATENTS

| | | |
|---|---|---|
| 562,091 | Germany | Oct. 21, 1932 |
| 574,324 | Germany | Apr. 12, 1933 |